3,427,558
SELF-BALANCING DIGITAL R.F. BRIDGE
Samuel R. McCutcheon, Saratoga, Calif., assignor to Fairchild Camera and Instrument Corporation, Syosset, N.Y., a corporation of Delaware
Filed Sept. 7, 1965, Ser. No. 485,303
U.S. Cl. 330—2      2 Claims
Int. Cl. G01r 23/00; H03f 3/38

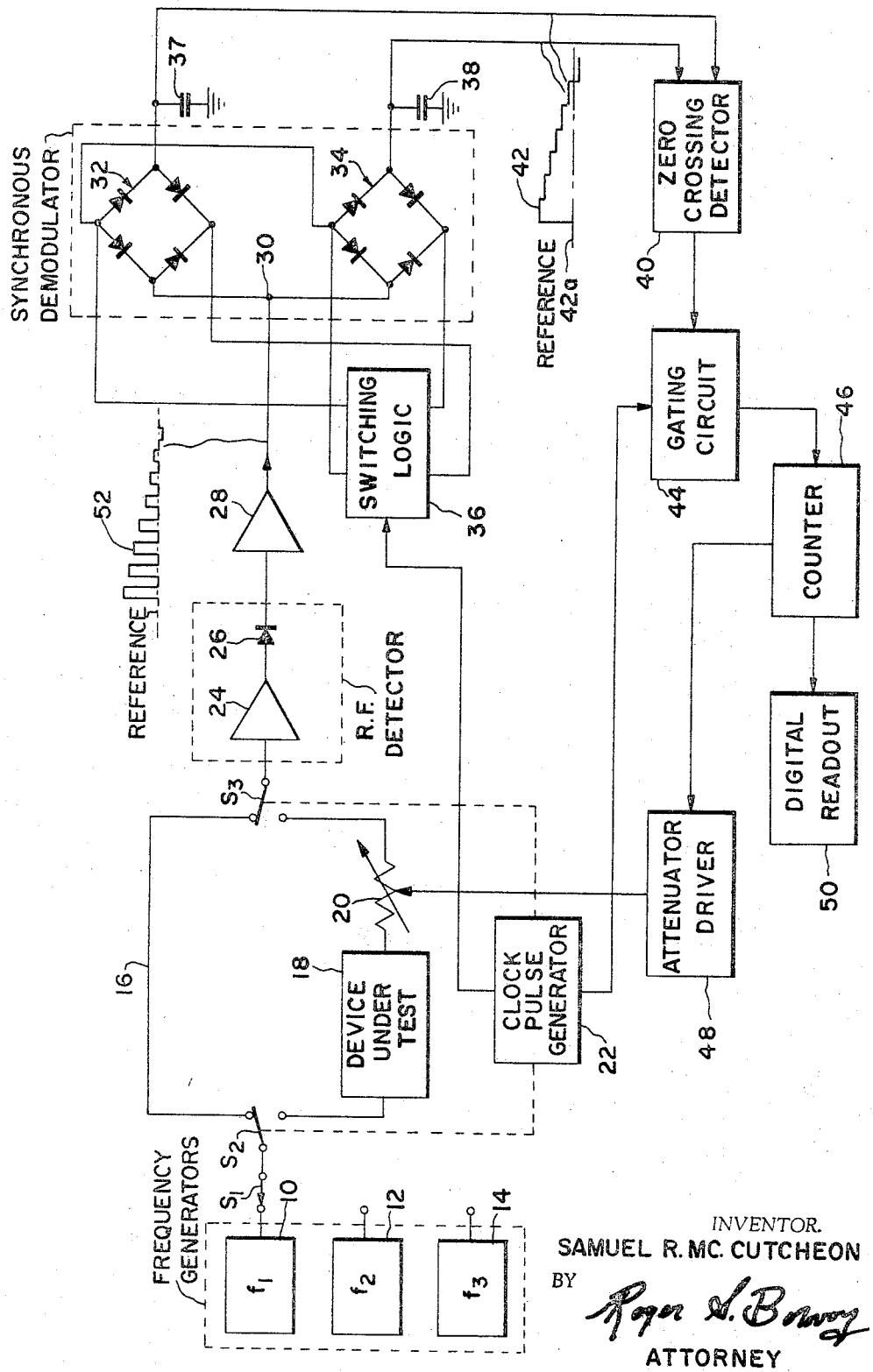

ABSTRACT OF THE DISCLOSURE

Apparatus for testing electrical devices by comparing two channels, one containing the device under test, and the other containing a signal of a fixed predetermined frequency. The two channels are continually switched and compared. A variable attenuator is placed in series with the device and is continually varied in accordance with the difference between the output signal from the channel having the fixed predetermined signal and the channel having the device until the two signals are the same. The apparatus includes a digital readout proportional to the required amount of variation in the circuit containing the device as an indication of the gain of the device.

---

This invention relates to a novel electrical test apparatus, and in particular to an apparatus that expeditiously, automatically and accurately measures the gain characteristic of power amplifiers or networks over a broad band of frequencies.

With the advent of wideband systems, such as television, radar, and data processors, it is apparent that circuits and components that operate successfully over a broad band of frequencies are highly desirable. Generally, it is preferable to employ such circuit components that maintain their electrical characteristics substantially constant, even when operating at different frequencies. This is especially true of gain or attenuation of amplifiers with specified input and output impedance, and operating at various frequencies. Also, although the gain of an amplifier may vary with frequency, it may be useful to know the pattern or characteristic of such variation so that performance by the amplifier in a system operating at different frequencies may be anticipated. Although the inventive concept is applicable for measuring different parameters of electrical devices, the following description will be directed to the measurement of gain of power amplifiers for ease of explanation.

Some types of prior known apparatus for measuring absolute gain or attenuation of a power amplifier require manual adjustments by an experienced operator during test. The test results are observed and manually registered as a record of performance for a given device. However, such methods are relatively slow, generally limited to performance at a single frequency or narrow frequency range, and not of optimum accuracy when dealing with low magnitude signal.

An object of this invention is to provide a novel and improved electrical test apparatus.

Another object of this invention is to provide an apparatus for testing electrical devices over a wide frequency range.

Another object is to provide a novel means for rapid, automatic and accurate measurement of power amplifiers over a large dynamic range.

The test apparatus of this invention comprises a first reference channel for providing and storing a reference signal; and a second test channel, including a variable component such as an attenuator, that is initially set at a value corresponding to the reference signal, and is driven cyclically in discrete successive steps at a predetemined rate controlled by a clock. A selected signal of constant frequency is applied alternately to such channels at the predetermined rate or frequency, while a device to be tested, such as a power amplifier for example, is coupled to the sampling or test channel in series with the attenuator. The signal output in the test channel is synchronously detected and separately stored for each cycle in the form of separate samples representing the performance characteristic of the amplifier. The separate samples of the output signal from the amplifier, which progressively vary in discrete steps as the attenuation varies, are compared with the reference signal for each cycle. As long as the output sample signal in the test channel is not substantially equivalent to the stored reference signal, a counter is activated to drive the attenuator by distinct steps, and to vary the overall gain so that the amplifier gain is neutralized by the attenuator. The driver counter concurrently actuates a digital readout, thereby providing a direct record and visual indication of the number of steps required to attain a substantially equal output from both channels. This automatically resolved number represents the magnitude of attenuation or gain of the amplifier while operating at the selected frequency.

The invention will be described with reference to the sole figure of the drawing, which is a schematic and block diagram of a test apparatus, in accordance with this invention.

In the drawing, one of a plurality of frequency generators 10, 12 and 14 is selected by means of a selector switch S1 for providing a constant frequency signal through a single pole, double throw type switch S2 alternately to a reference channel including a lead 16, and to a sample channel including the "device under test" 18 (hereinafter designated as "DUT") and a variable step attenuator 20. The frequency sources 10, 12, and 14 may provide frequencies such as 30, 50 or 100 megacycles per second (mc./sec.), by way of example. The chopper or switch S2 is actuated by pulses from a clock pulse generator 22 at a predetermined rate, say 60 cycles per second, whereby the reference channel is energized alternately with the test channel that incorporates the DUT 18 and attenuator 20.

As depicted in the drawing, when switch S2 is closed during every alternate half cycle, the frequency signal is passed through the lead 16 and through a similar switch S3 that operates synchronously with switch S2 in response to the clock 22. The signal is amplified by an amplifier 24 forming part of a radio frequency (R.F.) detector circuit, and fed through a unilateral conducting device or diode 26 to a video frequency amplifier 28. The video output from the reference channel including lead 16 is a DC reference signal that appears at a junction 30 located between the input of a pair of diode bridges 32 and 34.

When the reference channel is activated with switches S2 and S3 closed as shown, the clock 22 energizes a switching logic circuit 36 that alternately triggers the bridges 32 and 34 into conduction. When the reference channel is energized, the bridge 32 conducts and the bridge 34 is reverse biased and nonconducting; conversely, when the test channel is activated, the bridge 34 conducts and bridge 32 is back biased and nonconducting.

The amplified reference base signal from the amplifier 28 is thus passed through the bridge 32, and charges a capacitor 37 which stores the reference signal. The capacitor 37 has a long time constant whereby the stored reference signal may be continuously compared to separate discrete samples obtained in the test channel.

During the other half of each switching cycle, switches S2 and S3 are coupled across the DUT 18 and attenuator 20 in the test channel. The frequency signal from the selected frequency sources 10, 12 or 14 is applied to the DUT 18, which is a power amplifier in this case, wherein the applied signal is amplified in accordance with the gain characteristic of the amplifier 18 at the selected frequency. At the beginning of operation of the test apparatus, the attenuator 20 is set at zero, or some other reference value, so that without the DUT inserted in the test circuit, a substantially similar signal would be obtained at the output of either the reference or test channel.

With attenuator 20 preset, the amplified signal from the DUT 18 is directed through the attenuator 20, switch S3, the R.F. detector circuit, and the video amplifier 28 to the junction 30. Under control of the switching logic circuit 36 (which, in turn, is controlled by the clock 22), the bridge 34 becomes conducting when the DUT 18 in the test channel is energized. The amplified signal that passes through the bridge 34 is stored in a sampling capacitor 38. When the test channel is deactivated, the capacitor 38 holds its charge, and its voltage remains constant until the next sample is taken through the test channel. The signal voltages on capacitors 37 and 38 are compared by a differential amplifier or zero crossing detector 40 to provide an output signal whenever there is a difference between the compared voltages.

In accordance with this invention, a stair-stepped signal 42 consisting of discrete, substantially even-spaced portions, each representing a cycle of operation (1/60 second, for example), is fed from the test channel to the detector 40. In the detector 40, the stepped signal 42, which decreases by the same amount for each cycle, is compared to the constant amplitude reference signal 42a. If the sample signal 42 is greater than the reference signal 42a, a difference signal is provided to a gating circuit 44 coupled to the output circuit of the detector 40. The gate 44 receives a pulse from the clock 22 that is synchronous with the pulses applied to the reference and test channels. The concurrence of the 60 c.p.s. clock pulse and a signal from the zero crossing detector 40 opens the gating circuit 44, which provides a sharp output pulse to activate a counter 46. As long as the sampled signal in the test channel is positive relative to the reference signal, the counter 46 will count in synchronism with the clock pulse from the generator 22.

The counter 46 actuates an attenuator driver circuit 48 that incrementally displaces the variable tap of the attenuator 20, thereby increasing circuit attenuation in the test channel by one increment, such as 0.5 decibel (db), for each cycle. The output signal 52 from the video amplifier 28 obtained when the test channel is energized, progressively diminishes in level for each alternate half cycle by similar increments related to the attenuation provided. Simultaneously, the counter 46 drives a digital readout 50 that records the number of steps or increments through which the attenuator 20 is driven. When the demodulated signal that appears at the detector 40 is the same or slightly less than that of the base reference, a stop pulse is applied to the counter 46. The counter ceases to run, and the digital readout 50 and attenuator remain locked. At this point, it is apparent that the attenuation provided by the attenuator 20 effectively compensates or balances the amplification of the DUT 18, such that the signal passing through the switch S3 for both halves of the cycle is the same. The digital readout 50 affords a direct visual indication of the attenuation required, so that the sample signal 42 applied to the detector 40 becomes substantially equivalent to the reference signal 42a. Such indication, which may be provided on a readout or on a recorder, in a well known manner, represents the amplification characteristic of the device under test.

In one embodiment of this invention which was operated successfully, input frequency signals of 30, 50 and 100 mc./sec. were employed; and with a dynamic range of 39.5 db, a resolution of 0.5 db was realized. The null that was achieved was within one attenuation increment, 0.5 db, of the correct value of the null point. The digital information that was recorded by the readout 50 was correlated to the actual gain of the amplifier 18 at the preselected input frequency, so that a rapid, automatic readout was possible typically in a fraction of a second. It should be noted that variations in amplitude of the input signal from the selected frequency generator affects both the reference channel and test channel to the same degree, so that an accurate comparison of the attenuation may be made relative to the reference signal.

It should be understood that the invention is not limited to the particular configuration, parameters or values set forth above. The embodiment described with reference to the drawing may be modified or changed within the scope of the inventive concept. For example, the diode bridges of the synchronous demodulator may take the form of a mechanical, electrical or photoresponsive switch that operates in synchronism with the switches S2 and S3. Also, the crystal controlled generators 10 may provide frequencies in a broad range, such as from 1–250 mc./sec., and the number of test generators may be much greater than the three shown. Furthermore, other electrical devices than amplifiers may be tested with the apparatus of this invention.

What is claimed is:

1. A test apparatus for determining the gain characteristic of a power amplifier comprising:

a reference channel for providing a relatively constant reference signal;

a test channel adapted for coupling an amplifier to be tested therein, including a variable attenuator;

means for switching alternately between said reference and test channels;

means for providing a constant frequency signal alternately to said channels through said switching means;

means for obtaining a signal output alternately from each channel in synchronism with said switching means;

means for separately storing the output signals from each of said channels;

means coupled to both of said storing means for comparing said stored signals at discrete intervals;

an attenuator driver means for cyclically varying the attenuation of said attenuator in substantially equal increments for each of said intervals, responsive to said comparing means;

means coupled to said attenuator driver for counting the number of increments by which said attenuator is varied; and means coupled to said counting means for reading out the number count of such attenuator variations.

2. A test apparatus for determining the gain characteristic of a power amplifier comprising:

first channel means for supplying a reference signal;

second channel means including a variable attenuator, for connection to a power amplifier to be tested;

a plurality of crystal controlled oscillators;

a first switch means coupled to the output of one of such oscillators;

a second switch means coupled to said first switch means and capable of coupling either said first or second channels alternately to said one oscillator;

a clock pulse generator for activating said second switch means to couple said channels alternately to said oscillator at a predetermined rate;

detection means coupled to the output of said channels and controlled by said pulse generator synchronously with said second switch means for detecting the output signals from said channels;

a third switch means controlled by said pulse generator for coupling said channels to the detection means;

first and second capacitors for separately storing the output signals from the first and second channels, respectively;

a zero crossing detector coupled to the capacitors for comparing the stored signals;

a gating circuit coupled to the pulse generator and zero crossing detector for triggering a gating pulse when said output signals are different;

a counter coupled to the gating circuit for registering a numerical progression in response to the gating pulse;

an attenuator driver means coupled to said counter for increasing the attenuation of said test channel by a discrete step in response to each pulse from said counter; and a digital readout coupled to said counter for displaying the number of discrete steps of attenuation increase required to make the output signals substantially equal.

References Cited

UNITED STATES PATENTS 2,618,686  11/1952  De Lange _____ 330—2 X

FOREIGN PATENTS 594,813  3/1934  Germany.

NATHAN KAUFMAN, *Primary Examiner.*

U.S. Cl. X.R.

330—10